United States Patent [19]
Moore et al.

[11] Patent Number: 5,196,121
[45] Date of Patent: Mar. 23, 1993

[54] DECOMPOSITION OF HALOGENATED ALIPHATIC HYDROCARBONS IN A BIOREACTOR

[75] Inventors: Alan T. Moore, Cambridge; Maureen C. Leahy, Quincy; M. Margaret Findlay; Sam Fogel, both of Newton, all of Mass.

[73] Assignee: ABB Environmental Services, Inc., Portland, Me.

[21] Appl. No.: 416,500

[22] Filed: Oct. 3, 1989

Related U.S. Application Data

[63] Continuation-in-part of Ser. No. 253,087, Oct. 4, 1988, abandoned.

[51] Int. Cl.$^5$ ................................ C02F 3/08
[52] U.S. Cl. ................................ 210/603; 210/610; 210/614; 210/619; 210/908
[58] Field of Search ........ 210/603, 610, 611, 614–617, 210/620, 630, 631, 747, 908, 909, 928, 619; 435/247–250, 267, 281, 858

[56] References Cited

U.S. PATENT DOCUMENTS

| | | | |
|---|---|---|---|
| 4,713,343 | 12/1987 | Wilson, Jr. et al. | 210/611 |
| 4,749,491 | 6/1988 | Lawes et al. | 210/610 |
| 4,765,901 | 8/1988 | Field | 210/603 |
| 4,954,258 | 9/1990 | Little | 210/610 |

OTHER PUBLICATIONS

Moore et al., "Biodegradation of Trans-1,2-Dichloroethylene by Methane-Utilizing Bacteria in an Aquifer Simulator," *Environ. Sci. Technology*, vol. 23, No. 4 (1989), pp. 403–406.

Strandberg et al., "Degradation of Trichloroethylene and Trans-1,2-Dichloroethylene by a Methanotropic Consortium in a Fixed-Film, Packed-Bed Bioreactor," *Environ. Sci. Technology*, vol. 23, No. 11 (1989), pp. 1422–1425.

*Primary Examiner*—Thomas Wyse
*Attorney, Agent, or Firm*—Samuels, Gauthier & Stevens

[57] ABSTRACT

Methanotropics are grown in a bioreactor containing a solid support. They decompose halogenated aliphatic hydrocarbons found in ground water. The growth of the bacteria and the methane concentrations in the biomass reactor are controlled to significantly enhance the degradation of the hydrocarbons.

12 Claims, 5 Drawing Sheets

-◆- 15% CH4  --▲-- 5% CH4  --■-- 2% CH4

-◆- 15% CH4  --▲-- 5% CH4  --■-- 2% CH4

DECOMPOSITION OF HALOGENATED ALIPHATIC HYDROCARBONS IN A BIOREACTOR

CROSS REFERENCE TO RELATED APPLICATIONS

This application is a continuation-in-part application of U.S. Ser. No. 253,087 filed 4 October 1988, now abandoned.

FIELD OF THE INVENTION

The present invention relates to methods for treating water and gas contaminated with halogenated aliphatic hydrocarbons. Specifically, the invention employs an oxygen source, methane, and other nutrients to support the growth of a mixed culture of bacteria which carry out the decomposition of halogenated aliphatic hydrocarbons in a rotating biological contact reactor (RBC).

BACKGROUND OF THE INVENTION

The contamination of water by halogenated hydrocarbons is a serious environmental problem. Currently, methods to treat such water and gas include air stripping and absorption on activated carbon. Both methods result not in the destruction of the chlorinated compounds but only in their transfer to another media. Investigations of biological methods for treating halegonated hydrocarbon contamination have identified three biological systems which can metabolize these components.

Anaerobic organisms are able to carry out reductive dehalogenation of tetrachloroethylene and trichloroethene, (Vogel, et al. "Biotransformation of Tetrachloroethylene to trichloroethylene, dichloroethylene, Vinyl Chloride and Carbon Dioxide Under Methanogenic Conditions", Appl. Environ. Microbiol. 49, 5 (May 1985) pp. 1080–1083). However, this process results in the accumulation of vinyl chloride which is decomposed slowly to ethylene under anaerobic conditions (Freedman and Gossett, "Biological Reductive Dechlorination of Tetrachloroethylene and Trichloroethylene to Ethylene under Methanogenic Conditions", Appl. Environ. Microbiol, 55, 9 (Sept. 1989), pp. 2144–2151). Two aerobic systems have been described in which halogenated hydrocarbons are co-metabolized in the presence of another carbon source. Nelson et al. "Aerobic Metabolism of Trichloroethylene by Bacterial Isolate", Appl. Environ. Microbiol, 52, 2 (August 1986) pp. 383–384 have described a bacterium which metabolizes chlorinated hydrocarbons during growth on phenol, toluene or other aromatic compounds which are degraded by the meta-cleavage pathway. The chlorinated compounds are apparently first attacked by a dioxygenase and then finally metabolized to inorganic chloride and carbon dioxide. This process has limited application to environmental situtations due to the toxicity of the toluene or phenol food source.

The third biological system employs methanotrophs. These bacteria are aerobes which depend on methane as their sole source of carbon. Fogel et al., "Biodegradation of Chlorinated Ethenes by a Methane-Utilizing Mixed Culture", Appl. Environ. Microbiol., 51, 4 (Apr. 1986), pp. 720–724, showed that these organisms metabolize trichloroethylene in the presence of methane. Further studies confirmed that these organisms could decompose a wide range of halogenated hydrocarbons, including dichloroethylene, ethylene dibromide 1,1,1-trichloroethylene, vinyl chloride, methylene chloride (Fogel et al., "Biodegradation of Chlorinated Aliphatic Compounds by Methane-Oxidizing Bacteria: Mechanisms and Products", final report to the National Science Foundation, Award No. ISI-8560700, 1986).

No other biological systems for decomposing chlorinated hydrocarbons have been described. U.S. Pat. No. 4,749,491 to Lawes et al. claims an aerobic process which does not require a primary source of carbon in addition to the chlorinated compound. However, exhaustive investigations reported in the scientific literature have not detected organisms capable of this metabolic feat (Vogel et al., "Transformation of Halogenated Aliphatic Compounds", Environ. Sci. Technol. 21, 8 (August 1987), pp. 772–736, 1987).

The present invention employs methanotrophs to degrade halogenated hydrocarbons in a rotating biological contactor (RBC).

BRIEF SUMMARY OF THE INVENTION

In this present invention, it has been found that methanotrophs grown in a bioreactor containing a solid support can decompose contaminates in water, specifically halogenated aliphatic hydrocarbons such as trichloroethylene, ethylene dibromide, trans-dichloroethylene, cis-trichloroethylene, vinyl chloride, methylene chloride and 1,1,1-trichloroethane. The process of the invention is effective at a wide range of contaminant concentrations from high concentration such as 10,000 parts per billion to very low concentrations such as 10 parts per billion.

The invention is an improvement of the process disclosed in the parent application. In the parent application, the growth of the bacteria was controlled to allow the trichloroethylene to biodegrade more effectively. It has now been found that the process can be used to biodegrade halogenated aliphatic contaminants generally and that such degradation is highly sensitive to methane concentrations in a biomass reactor.

DESCRIPTION OF THE PREFERRED EMBODIMENT(S)

The present invention consists of a process in which methanotrophs grown in a bioreactor are used to treat water or air contaminated with volatile halogenated hydrocarbons.

Figure 1:
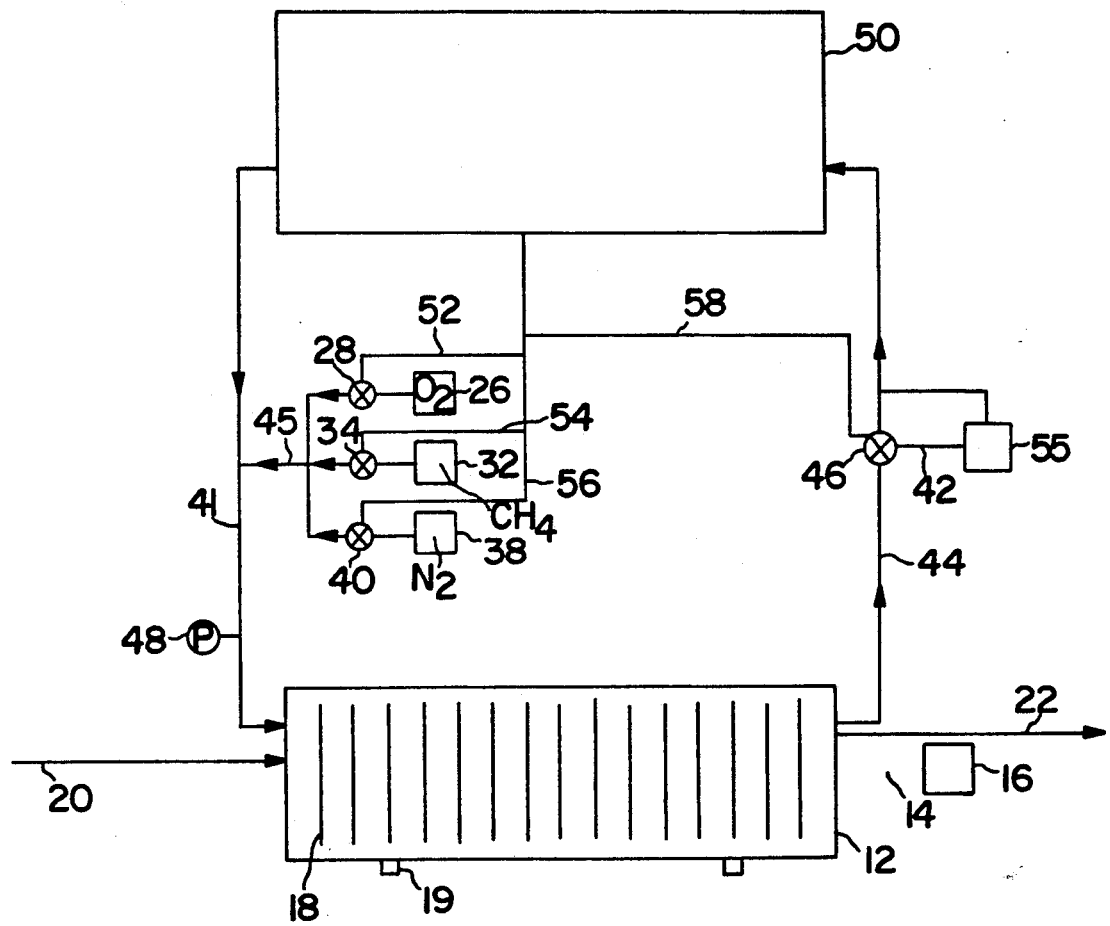
FIG. 1 is a perspective view of one type of reactor that may be used in the process.

Referring to FIG. 1, a generally cylindrical reactor 12 has received therein a shaft 14 mounted in sealed bearings (not shown) at either end of the reactor which shaft is driven by a motor 16. The shaft includes a plurality of discs 18 in parallel, spaced apart relationship for rotation with the shaft. A feed conduit 20 is used for the introduction of contaminated air and/or water and a discharge conduit 22 removes the treated air and/or water from the reactor 12. Feed gas is introduced into the reactor through line 41. Oxygen is introduced into line 45 from a source 26 via a valve 28. Methane is introduced into line 45 from source 32 via valve 34. Nitrogen is introduced into line 45 from a source 38 via the valve 40. Carbon dioxide is removed from the reactor 12 by line 44 into a trap 55 by line 42 via valve 46. A pressure sensor 48 monitors the pressure in the reaction vessel.

A control sensor is shown in block form and comprises the instrumentation for monitoring and controlling the flow of the oxygen, nitrogen and methane into the reactor and the flow of carbon dioxide from the reactor. Lines 52, 54 and 56 include sensors for measuring the concentration of the oxygen, methane and nitrogen respectively. Line 58 includes a sensor for the concentration of the carbon dioxide. These sensors also communicate with the appropriate valves to control the flow of the gases in to and out of the reactor 12. The specific instrumentation for the measurement of the concentrations of gases and for the control of the valves for the flow of fluids in to and out of the reactor are well within the art and need not be described in detail.

The discs covered with biomass are usually half submerged in the liquid phase. This ensures that the contaminants to be biodegraded, whether in a gas (vapor phase) or liquid phase, will be contacted by the rotating discs. A sampling port is shown at 19.

The fluids, water or gas (air) to be treated by the process can contain other organic compounds such as monoaromatic compounds and acetone in addition to halogenated aliphatic compounds. The fluids may also have received a previous treatment such as treatment by an anaerobic biological process by which highly halogenated compounds are transformed to less halogenated compounds that are more readily treated by the process described herein.

A mixed culture of bacteria including methanotrophs are first introduced to the reactor under optimum growth conditions. The culture may be the indigenous bacteria population in the water to be treated or a population isolated from soil or sediment from near anoxic subsurface environments. The methanotrophs are typically found in the sediment of fresh water lakes or ponds.

Typically, the bacteria are fed oxygen and methane at levels found to support maximum growth. Sources of nitrogen and phosphorous and, optionally, other nutrients, are introduced into the water. The utilization rates of methane and oxygen and the production of carbon dioxide can be used to monitor bacteria growth.

While a number of other reactor configurations can be used in this process, a rotating biological contactor has been shown to be suitable in laboratory experiments. A cascade of such reactors, in which two or more reactors are operated in series, is also suitable for this process. These designs can be scaled-up to provide the capacity required for full-scale operation. This reactor configuration further increases the availability of methane, oxygen, and the volatile contaminants to the microorganisms.

The reactor used in the experiments described below had a total capacity of 12 liters. Approximately 7 liters of the reactor volume contained water, filling the reactor to just over the rotation shaft and covering approximately 60% of the surface of the growth discs. This level of water, over 50% of the volume of the reactor, is not usually used in rotating biological contactors.

The sources of oxygen and methane are connected to the reactor above the level of the water. The atmosphere of the reactor in contact with the discs is then maintained at the prescribed concentrations for optimum growth and degradation. The source of nitrogen can also be connected to the reactor above the water level to maintain the pressure in the reactor at or near 1 atmosphere.

The line for carbon dioxide removal is also connected to the reactor above the level of the water. Although the concentrations of carbon dioxide do not appear to affect the process, the concentration of carbon dioxide is maintained between 2% (v/v) and 7% (v/v), although other concentrations are suitable.

The reactor may be operated in either batch mode or as a continuous flow reactor. Laboratory experiments were conducted in both modes.

The discs can be made of any of a number of materials. Experiments were performed on discs made of Teflon, polyethylene and glass fiber mats (Manville Scientific, Colorado). The reactor 12 was about 12 liters in volume and contained between 30 and 200 circular discs such as described above.

This system differs from most rotating biological contactor systems, such as those used in sewage treatment, in that the system was designed to be gas-tight. A typical RBC would be exposed to the atmosphere to provide a cheap and unlimited source of aeration (oxygen) required to support the microbial process. Due to the volatile nature of the chlorinated compounds to be degraded in our process and the need for conservation and containment of methane, the reactor and all associated parts were sealed off from the atmosphere.

The control sensor console continuously sampled, analyzed and recorded the concentrations of methane, oxygen and carbon dioxide in the reactor and controlled these concentrations.

The control-sensor console comprised a gas analyzer system in communication with the headspace of the reactor. This unit consisted of an infrared methane analyzer, an infrared carbon dioxide analyzer and a paramagnetic oxygen analyzer. Headspace gases from the reactor were pumped through the analyzers by a teflon-diaphragm pump (not shown). The entire system was contained in a nitrogen-purged enclosure with emergency electrical shutoff in the event of loss of nitrogen pressure due to the potential explosive nature of methane/oxygen mixtures.

The analyzers were connected to a programmable process control system to allow maintenance of gas concentrations in the reactor. The signals from the analyzers were sent to a 3-pen strip chart recorder equipped with alarm switches which, when activated at specific gas concentrations, sent output signals to the programmable process controller. The process controller was programmed to open the solenoid valves to feed in oxygen or methane when their concentrations dropped below the set points and to divert the headspace flow through a carbon dioxide removal system when the concentration of carbon dioxide exceeded a set point.

Experiments were carried out to determine the effect of varying the methane and oxygen concentrations on the growth of the methanotrophic bacteria which form the biomass in the reactor. This information was used to choose optimum conditions for generating the biomass in the reactor. Further, because chlorinated compounds are oxidized by the same metabolic systems which oxidize methane, this information allows prediction of the optimum ratios of oxygen and methane concentrations to be used during degradation.

Microbial Culture

The bacterial culture used in these experiments was isolated from marsh sediments and has been previously described by our laboratory (Fogel et al., supra). The culture consists of a methanotrophic consortium which is dependent on methane as a carbon source for growth. The culture is maintained in liquid mineral salts media in the presence of methane and oxygen. Specifically, it was cultured as follows. The mineral salts medium consisted of the following (in milligrams liter$^{-1}$): $MgSO_4 \cdot 7H_2O$, 200; $CaCl_2 \cdot 2H_2O$, 20; $NaNO_3$, 1,000; $FeSO_4 \cdot 7H_2O$, 3; $KCl$, 40; $KH_2PO_4$, 160; $Na_2HPO_4$, 184; $ZnSO_4 \cdot 7H_2O$, 0.07; $MnCl_2 \cdot 4H_2O$, 0.02; $H_3BO_4$, 0.02; $CoCl_2 \cdot 6H_2O$, 0.1; $CuCl_2$, 0.01; $NiCl_2 \cdot 6H_2O$, 0.02; and $Na_2MoO_4 \cdot 2DH_2O$, 0.03, at a final pH of 6.8. Cultures were grown in this liquid medium in serum bottles capped with Teflon-lined silicone septa and sealed with aluminum caps. Methane was injected to 15% v/v in the headspace.

In other batch tests, different isolates of methanotrophic consortia have been shown to be capable of degrading halogenated ethanes, ethenes and methanes, and would, therefore, be appropriate for use in the process described herein.

After culture, the methanotrophic consortium (approximately 25 milligrams) was seeded into the water in the reactor with mineral salts media as described and grown in the presence of between 10 and 20% v/v methane and oxygen for approximately one month. Periodically, the oxygen feed was turned off for approximately 12 hours and the reactor was allowed to be depleted of oxygen. This treatment controlled the growth of aerobic organisms not capable of growing on methane as these organisms tend to be sensitive to oxygen starvation while methanotrophs are not. After approximately four weeks of growth in the presence of methane and oxygen with periodic depletion of oxygen, the biomass developed to a steady state as measured by a constant rate of utilization of methane at a given oxygen concentration. Specifically, the biomass in the reactor consumed 12 moles of methane per hour at 20% v/v oxygen.

Growth Experiments

Figure 2:
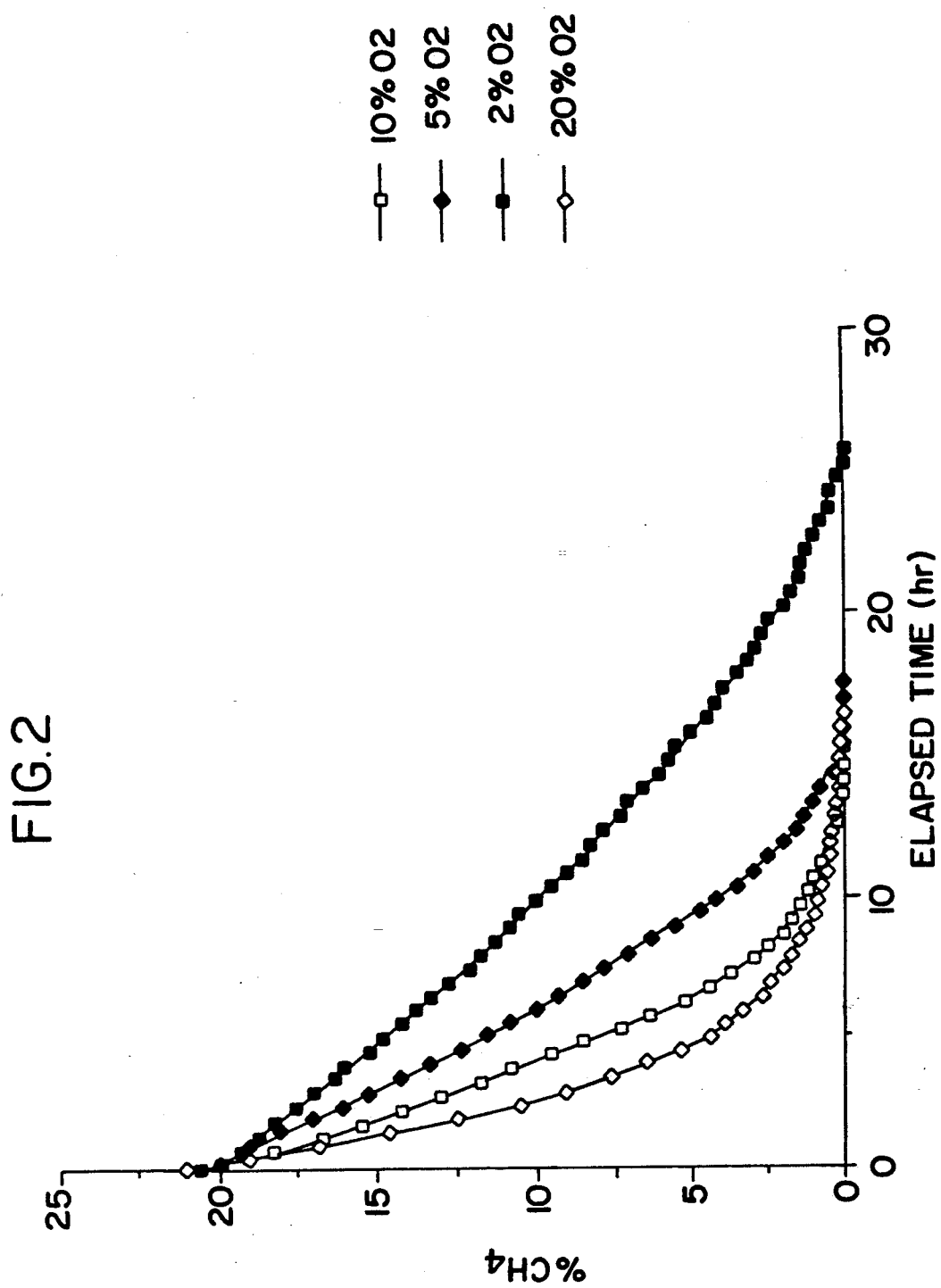
FIG. 2 is a graph showing the consumption of methane by the bacterial culture growing in the reactor under four different oxygen concentrations.
Figure 3:
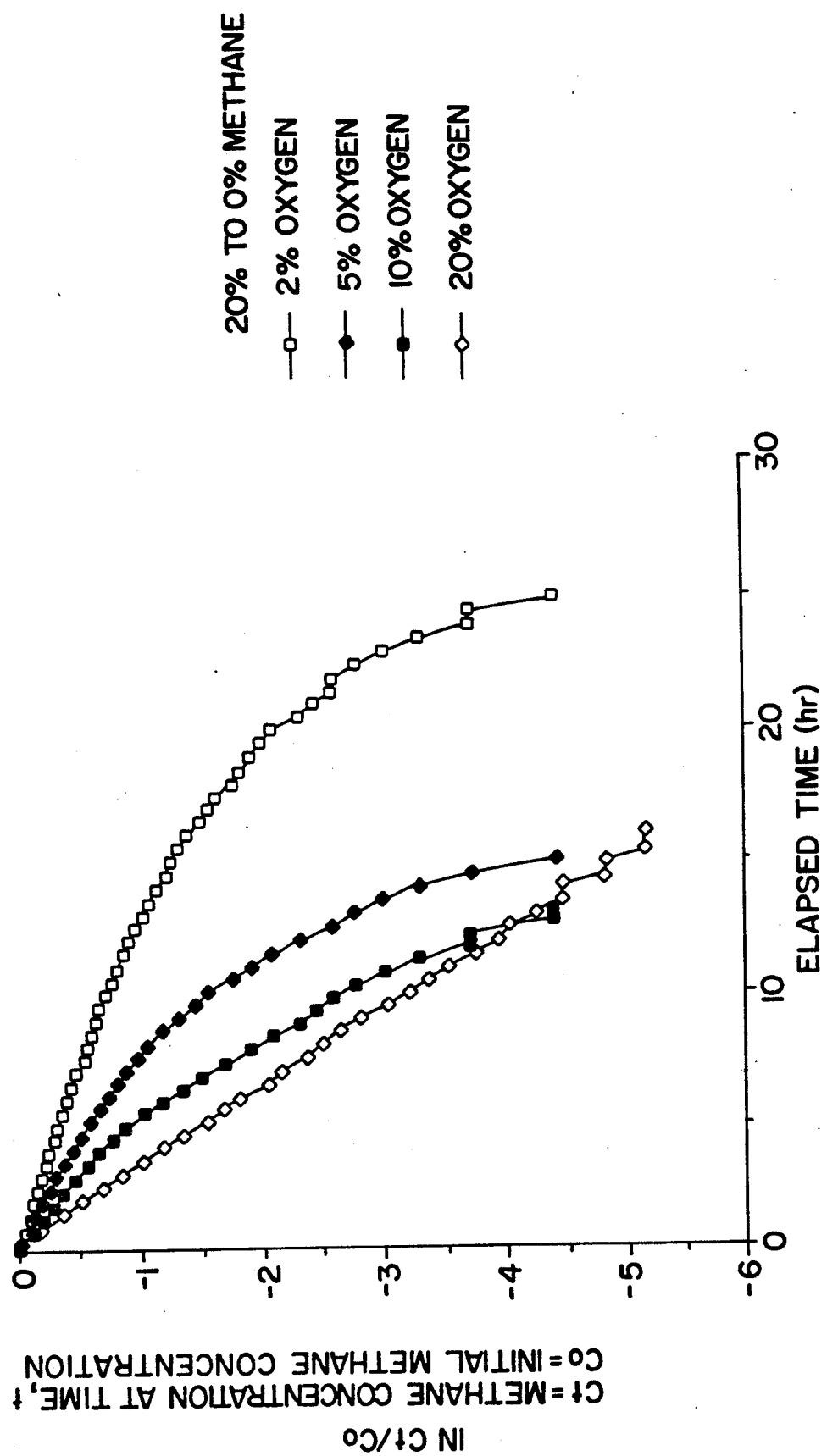
FIG. 3 is a first order rate plot of methane consumption under four different oxygen concentrations.

These experiments were performed after the biomass in the reactor reached steady state growth. For these experiments, either the methane concentration was varied while oxygen concentration in the reactor was kept constant or the oxygen concentration was varied with the methane concentrate kept constant. The rate of utilization of methane, the sole carbon source of this consortium, was then used as an indicator of metabolic growth. The data from representative growth experiments are shown in FIG. 2. The first order plot of this data is shown in FIG. 3.

Prior to carrying out degradation experiments in the 12 liter reactor, preliminary experiments were performed in 160 milliliter gas-tight bottles to test the ability of the methanotrophic consortium to degrade halogenated aliphatic compounds other than trichloroethylene. Specifically, the methanotrophic consortium (approximately 10 milligrams) was seeded into 50 mls mineral salts media (as described) in 160 ml serum bottles sealed with Teflon-faced silicone septa. Methane was added to the headspace of the bottles to achieve 15% (v/v). Test compounds were added to the starting concentrations indicated in Table 1 and the cultures were grown at 20° C. with shaking on a platform shaker. The test compounds were methylene chloride, chloroform, vinyl chloride, dichloroethane, 1,1,1,-trichloroethane, cis-1,2-dichloroethene, trans-1,2-dichloroethane, 1,1-vinylidene chloride, and ethylene dibromide. The data from these experiments are presented in Table 1. All nine test compounds were degraded by the methanotrophic consortium. These results extend the original observation that methanotrophic bacteria are able to degrade trichloroethene to include halogenated aliphatic compounds in general.

TABLE 1

| Test compound | Starting Concentration (ppb) | Final Concentration (ppb) | Time of Incubation (hr) |
|---|---|---|---|
| methylene chloride | 2500 | 0 | 42 |
| chloroform | 2900 | 100 | 187 |
| vinyl chloride | 1200 | 0 | 47 |
| 1,2-dichloroethane | 3600 | 0 | 43 |
| 1,1,1-trichloroethane | 850 | 310 | 337 |
| cis-1,2-dichloroethene | 2000 | 0 | 40 |
| trans-1,2-dichloroethane | 3000 | 0 | 52 |
| 1,1-vinylidene chloride | 1500 | 530 | 306 |
| ethylene dibromide | 3200 | 64 | 239 |

Degradation Experiments in Batch Mode

Experiments to test the degradation of halogenated solvents in the reactor were tested in batch mode. The experiments were conducted at constant oxygen concentration (10% v/v), while the methane concentration was varied between experiments (2%, 5% and 15% v/v).

Prior to adding the halogenated test compounds to the reactor, the oxygen concentration in the reactor was adjusted to 10% v/v and the methane concentration adjusted to the appropriate concentration. A mixture of equal parts tetrachloroethylene (TECE), trichloroethylene (TCE), and cis-dichloroethylene (cis-DCE) was then added to the liquid in the reactor to give a concentration in the reactor liquid of approximatley 700 ppb (parts per billion) each. Tetrachloroethylene is not degraded by methanotrophs and serves as a control compound.

Periodically, samples were taken from the reactor after the addition of the test compounds. EPA Method 601 was used to monitor the concentrations of the chlorinated solvents in the reactor. This method is specific for volatile chlorinated compounds. A 0.5 ml liquid sample was withdrawn using a gas-tight syringe from the liquid in the reactor through the sampling port 19 for analysis. Sampling was continued until cis-dichloroethylene could no longer be detected in the reactor liquid.

This procedure was repeated at three different methane concentrations to determine the effect of methane concentration on the rate of degradation and thus the efficiency of the reactor process.

Figure 4:
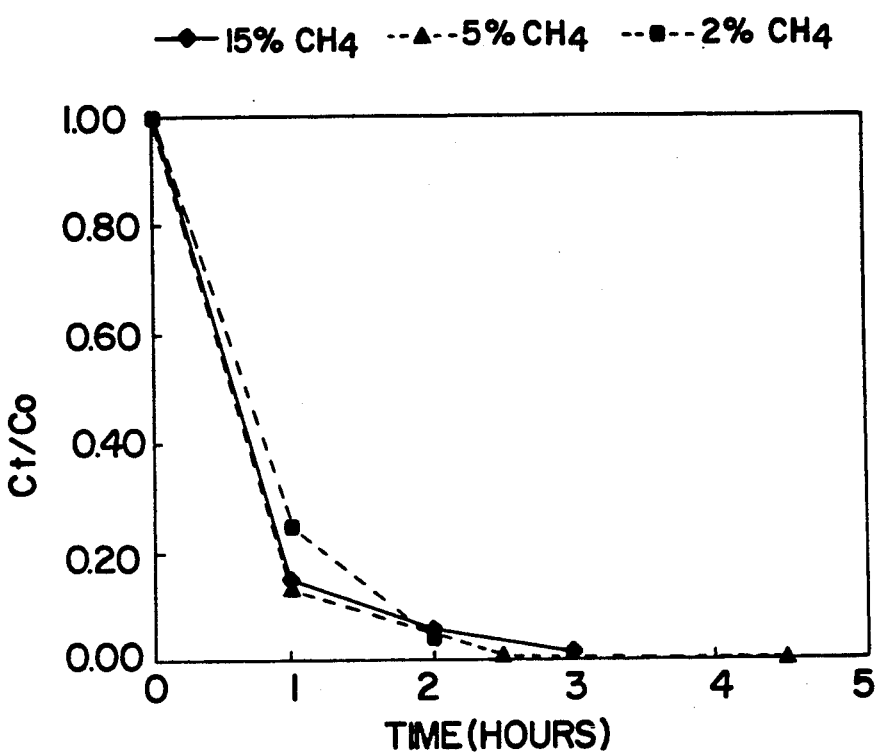
FIG. 4 is a graph showing the degradation of cis-dichloroethene in the reactor at three different methane concentrations.
Figure 5:
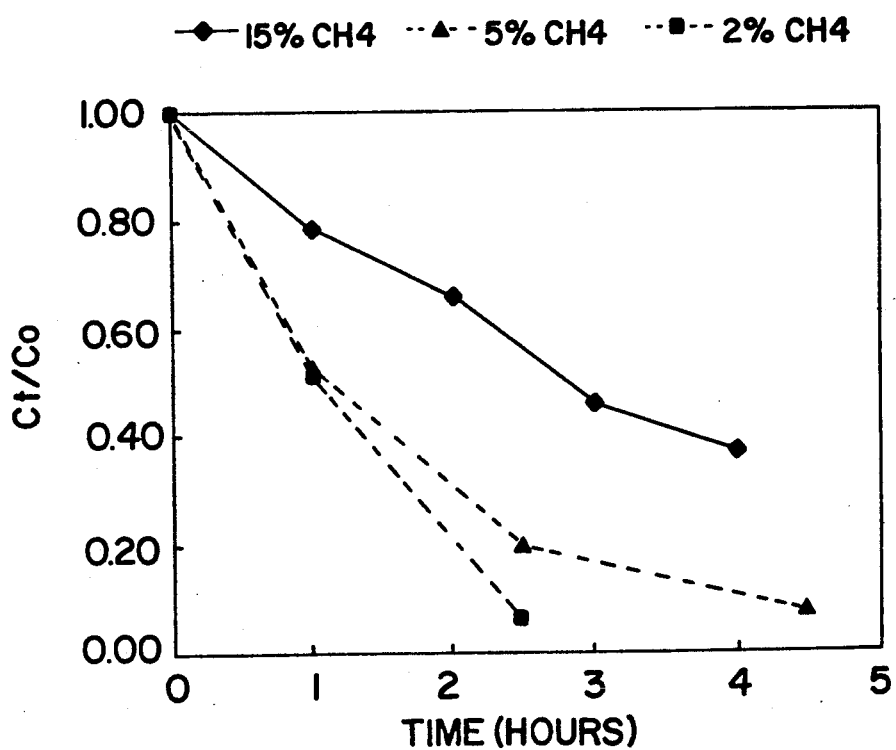
FIG. 5 is a graph showing the degradation of trichloroethene in the reactor at three different methane concentrations.
Figure 6:
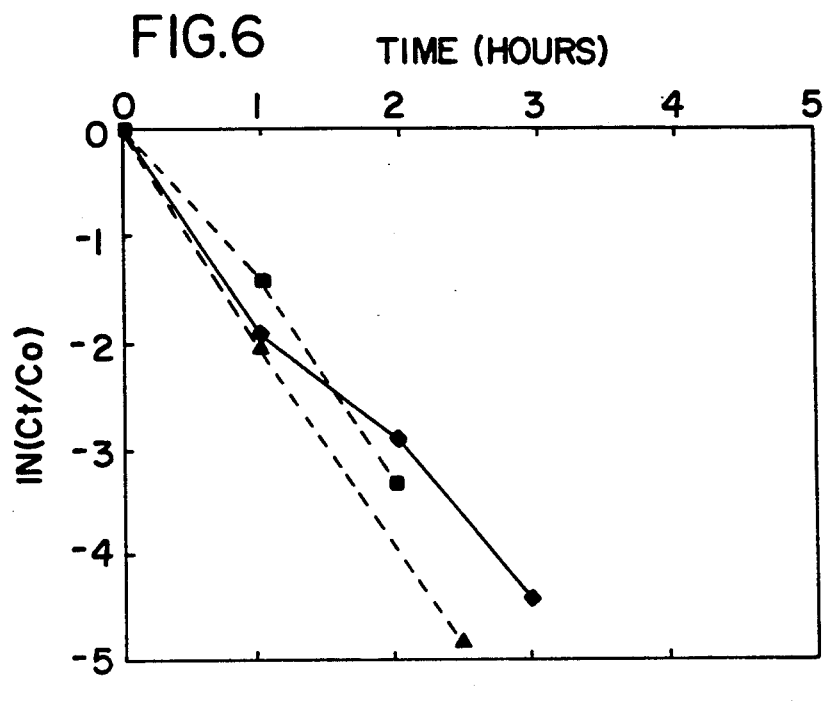
FIG. 6 is a first order rate plot in which the slopes of the lines give the first order rate constants for the degradation of cis-dichloroethene in the reactor at three different methane concentrations.
Figure 7:
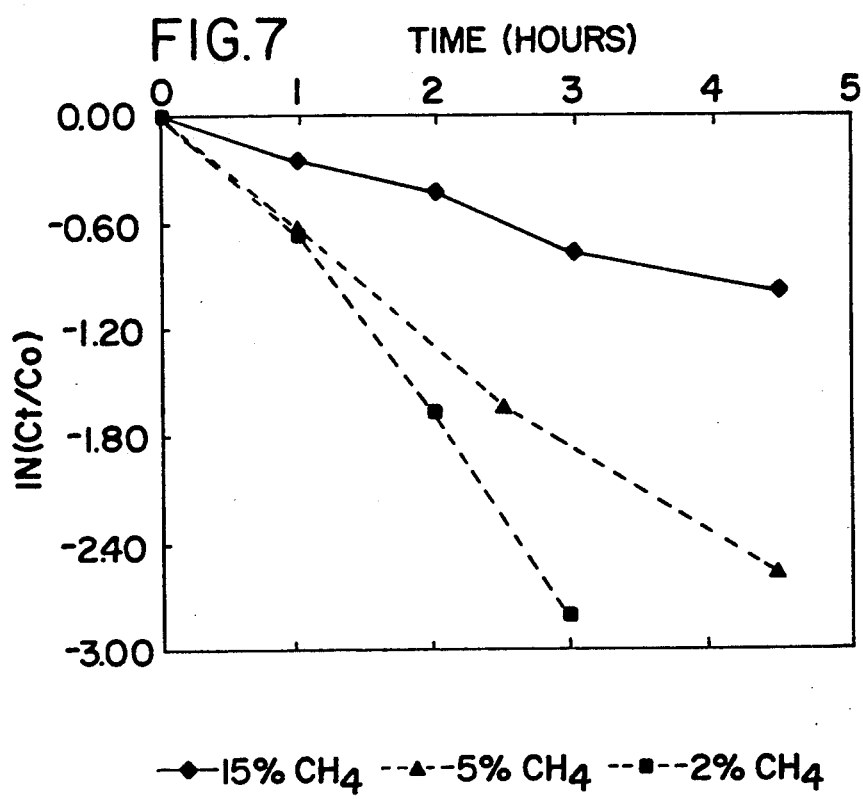
FIG. 7 is a first order rate plot in which the slopes of the lines give the first order rate constants for the degradation of trichloroethene in the reactor at three different methane concentrations.

The concentrations of TCE and cis-DCE were normalized to the concentration of TECE in order to correct for sampling errors, incomplete mixing, adsorption and leakage from the reactor. These data are presented in the accompanying two FIGS. 4 and 5. The rate of degradation of these compounds was then calculated, assuming first order kinetics. FIGS. 6 and 7 show the first order rate plots. The linearity of these plots is consistent with the assumption that the degradation of the test compounds TCE and DCE follow pseudo-first order kinetics.

The data confirms that this reactor process can successfully degrade halogenated compounds. Further, the degradation is highly sensitive to methane concentration, especially in the case of TCE, as shown by the decrease in slopes of the first order rate plots with increased methane concentration in FIG. 6.

The drawings and descriptions provided herein are generic and are not for purposes of limitation.

Having described our invention, what we now claim is:

1. A method for biodegrading volatile halogenated contaminants in a fluid stream which includes:
    maintaining a sealed environment in a rotating biological contactor;
    maintaining a methanotrophic biomass in the contactor;
    introducing methane and oxygen into the contactor;
    introducing a fluid stream containing the halogenated contaminants into the contactor;
    biodegrading the halogenated contaminants;
    measuring the amount of methane consumed in the biodegradable reaction; and
    controlling the flow of methane and oxygen into the contactor based on the consumption of methane to slow the reaction rate of the methanotrophic biomass and to maintain the methane concentration in the contactor at a desired level.

2. The method of claim 1 wherein the halogenated contaminants are selected from the group consisting of trichloroethylene, trans-dichloroethylene, cistrichloroethylene, methylene chloride, 1,1,1-trichloroethane, chloroform, methylene chloride and dichloroethane, ethylene dibromide, 1,1a-vinylidene chloride, and vinylchloride.

3. The method of claim 1 wherein the initial concentrations of the contaminants are between about 10 ppb to 10,000 ppb.

4. The process of claim 1 which includes:
    maintaining the pressure in the contactor at a constant pressure.

5. The process of claim 4 which includes:
    introducing nitrogen into the contactor.

6. The method of claim 1 which includes:
    maintaining the concentration of the methane in the contactor between 0 to 20%.

7. The method of claim 6 which includes:
    maintaining the level of oxygen in the contactor constant.

8. The method of claim 7 wherein the concentration of oxygen in the contactor is between 5 to 15%.

9. The process of claim 7 wherein one of the reaction products is carbon dioxide and which includes:
    maintaining the carbon dioxide in the contactor within pre-determined limits.

10. The process of claim 9 wherein the carbon dioxide is maintained between 2 to 7% (V/V).

11. The process of claim 1 wherein one of the reaction products is carbon dioxide and which includes:
    removing at least a portion of the carbon dioxide.

12. The process of claim 1 which includes:
    introducing a methanotrophic consortium into the contactor;
    growing the consortium in the presence of methane and oxygen;
    controlling the growth of aerobic organisms; and
    continuing the growth of the consortium until it forms a biomass at a steady state.

* * * * *